United States Patent
Chen

(10) Patent No.: US 7,533,284 B2
(45) Date of Patent: May 12, 2009

(54) SYSTEM FOR CONTROLLING AN OPERATION STATE OF A PORTABLE COMPUTER BASED ON DETECTED TEMPERATURE OF AN EXTERNAL TRANSFORMER

(75) Inventor: Sheng-Feng Chen, Taipei Shien (TW)

(73) Assignee: Quanta Computer, Inc., Tao Yuan Shien (TW)

( * ) Notice: Subject to any disclaimer, the term of this patent is extended or adjusted under 35 U.S.C. 154(b) by 464 days.

(21) Appl. No.: 11/195,648

(22) Filed: Aug. 3, 2005

(65) Prior Publication Data

US 2006/0259794 A1  Nov. 16, 2006

(30) Foreign Application Priority Data

May 11, 2005 (TW) .............................. 94115264 A

(51) Int. Cl.
*G06F 1/28* (2006.01)
(52) U.S. Cl. ...................... 713/340; 713/310; 713/322; 361/103; 702/64; 320/150
(58) Field of Classification Search ................. 713/340, 713/310, 322; 361/103; 702/64; 320/150
See application file for complete search history.

(56) References Cited

U.S. PATENT DOCUMENTS 6,157,169 A * 12/2000 Lee ............................ 320/132
6,893,153 B2 * 5/2005 Hoffer et al. ................. 374/152
6,928,568 B2 * 8/2005 Breen et al. .................. 713/340
6,948,078 B2 * 9/2005 Odaohhara ................... 713/300
6,950,950 B2 * 9/2005 Sawyers et al. .............. 713/300
2002/0038795 A1 * 4/2002 Katooka et al. ........ 219/130.21
2003/0167415 A1 * 9/2003 Odaohhara et al. .......... 713/340

FOREIGN PATENT DOCUMENTS

| JP | 8251830 | 9/1996 |
| JP | 2002-051478 | 2/2002 |
| TW | 405784 Y | 9/2000 |
| TW | 530198 B | 5/2003 |

* cited by examiner

*Primary Examiner*—Thuan N Du
(74) *Attorney, Agent, or Firm*—Rabin & Berdo, P.C.

(57) ABSTRACT

A temperature control system used in a portable computer comprises a first control part, a second control part connected to an operation processing unit (OPU), a third control part and a fourth control part connected to a charge part. The first control part outputs a first control signal for responding the temperature and load current changes of an external power transformer. The third control part outputs a second control signal for responding the temperature and load current changes of a battery. When the portable computer is powered by the external transformer, the second control part receives the first control signal to control the OPU, and the fourth control part controls the charge current of the charge part. When the portable computer is powered by the battery, the second control part receives the second control signal to control the OPU.

9 Claims, 7 Drawing Sheets

SYSTEM FOR CONTROLLING AN OPERATION STATE OF A PORTABLE COMPUTER BASED ON DETECTED TEMPERATURE OF AN EXTERNAL TRANSFORMER

RELATED APPLICATIONS

The present application is based on, and claims priority from, Taiwan Application Serial Number 94115264, filed May 11, 2005, the disclosure of which is hereby incorporated by reference herein in its entirety.

FIELD OF THE INVENTION

The present invention relates to a temperature control system, and more particularly, to a temperature control system used in a portable computer for automatically adjusting the power consumption of the portable computer in accordance with the temperature and load current changes of the power source.

BACKGROUND OF THE INVENTION

A portable computer (such as a notebook computer) generally is powered via an external power transformer or a battery, and the external power transformer or battery generates heat due to efficiency loss or increasing load current. When the heat generation increases, the heat dissipation effect has to be enhanced generally by enlarging the heat-dissipating apparatus or surface; or increasing cooling airflow. However, if the ambient temperature is high, the heat generated from the external power transformer or battery cannot be dissipated easily, and thus the performance and operation life of the portable computer will be affected while the portable computer is continuously operated in a high-temperature environment.

For meeting the requirements of power consumption and high ambient temperature when the portable computer is operated at the maximum capability, the power output of the external power transformer or battery is usually used to meeting the power consumption for the portable computer operated at the maximum capability in the highest ambient temperature, so that not only the production cost is increased, but also the size of the external power transformer or battery and the space required for its heat dissipation have to be increased, thus failing to satisfy the requirements of lightness, thinness and smallness for the portable computer.

Further, due to different power consumption for different models of portable computers, even if the portable computers all have the same connectors, one single type of the external power transformer or battery is not generically applicable to the portable computers of different models.

SUMMARY OF THE INVENTION

Therefore, an aspect of the present invention is to provide a temperature control system for controlling power consumption by responding to temperature and load current, thereby ensuring the performance of an external power transformer or battery and prolonging its operation life.

Another aspect of the present invention is to provide a temperature control system for designing the power output of the external power transformer or battery to be corresponding to the normal power consumption of a portable computer, thereby reducing the production cost and size of the external power transformer or battery.

Another aspect of the present invention is to provide a temperature control system for automatically controlling power consumption, so that the external power transformer or battery can be generically applicable to the portable computers with different powers.

According to the aforementioned aspects, the temperature control system of the present invention is used in a portable computer, and comprises a first control part, a second control part, a third control part and a fourth control part. The first control part outputs one control signal in response to the temperature and load current changes of an external power transformer. The second control part is connected to an operation processing unit (OPU). The third control part outputs the other control signal in response to the temperature and load current changes of a battery. The fourth control part is connected to a charge part. When the portable computer is powered by the external power transformer, the second control part receives the control signal for controlling the operation state of the operation processing unit, and meanwhile the fourth control part receives the control signal for controlling the charge current of the charge part. When the portable computer is powered by the battery, the second control part receives the other control signal for controlling the operation state of the operation processing unit.

The first control part comprises a comparing circuit and a temperature sensor. A reference voltage generated by the temperature sensor is inputted into one input terminal of the comparing circuit, and a comparing voltage generated from the load current of the portable computer is inputted into the other input terminal of the comparing circuit, and the comparing circuit generates and outputs the control signal after comparing the reference voltage and the comparing voltage.

The second control part comprises a comparing circuit and an oscillating circuit. A time-sequence signal generated by the oscillating circuit is inputted into one input terminal of the comparing circuit, and the control signal or the other control signal is inputted into the other input terminal of the comparing circuit, and the comparing circuit generates and outputs a signal used for controlling the operation processing unit, after comparing the time-sequence signal and the control signal or the other control signal.

The third control part comprises a comparing circuit and a temperature sensor. A reference voltage generated by the temperature sensor is inputted into one input terminal of the comparing circuit, and a comparing voltage generated from the load current of the portable computer is inputted into the other input terminal of the comparing circuit, and the comparing circuit generates and outputs the other control signal after comparing the reference voltage and the comparing voltage.

The fourth control part comprises three resistors, wherein one end of the combination of the three resistors is commonly connected to the charge part, wherein the other ends of the three resistors are connected respectively to a fixed-voltage source, the control signal and ground, whereby the descending ratio of charge current and the minimum charge current are adjusted by adjusting the values of the three resistors.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

Figure 1:
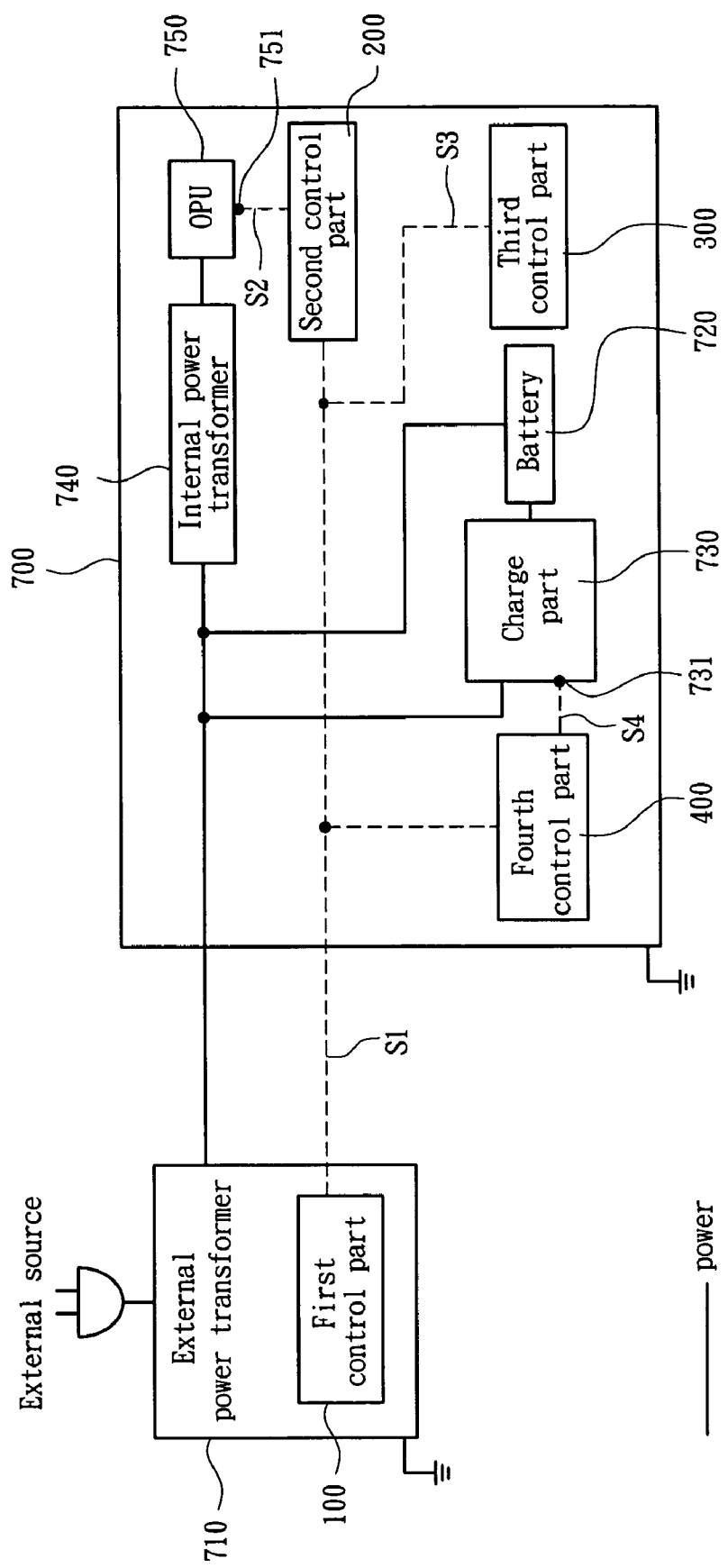
FIG. 1 is a schematic system block diagram of a preferred embodiment of the present invention.

Such as shown in FIG. 1, the temperature control system of the present invention is used in a portable computer, wherein the power consumption of the portable computer is adjusted by using the response with respect to the temperature and load current changes. The portable computer 700 generally includes an external power transformer 710, a battery 720, an internal power transformer 740 and an operation processing unit (OPU) 750 such as a central processing unit (CPU). The external power transformer 710 converts external power for supplying power to the portable computer 700. The battery 720 can be a rechargeable battery located inside the portable computer 700. When the external power transformer 710 stops supplying power, the battery 720 takes over to supply the power required for operating the portable computer 700. A charge part 730 converts the power supplied from the external power transformer 710 to the power required for charging the battery 720, and the charge part 730 generally includes a pin 731 for controlling recharging current, wherein the pin 731 receives a control signal S4 from a fourth control part 400 for controlling the value of the charging current outputted from the charge part 730. The internal power transformer 740 converts the power from the external power transformer 710 or the battery 720 to the power required for operating the OPU 750. The OPU 750 generally includes a pin 751 for controlling operation state thereof, wherein the pin 751 receives a control signal S2 from a second control part 200. When the pin 751 (or the control signal S2) is at a high voltage level (Hi), the OPU 750 is in a high-speed operation state and consumes relatively much power. When the pin 751 (or the control signal S2) is at a low voltage level (Lo), the OPU 750 is in a low-speed operation state and consumes relatively little power.

The temperature control system of the present invention includes a first control part 100, the second control part 200, a third control part 300 and the fourth control part 400. The first control part 100 is located in the external power transformer 710, and outputs a control signal S1 in response to the temperature and load current changes of the external power transformer 710. The second control part 200 is connected to the pin 751 for controlling the operation state of the OPU 750. The third control part 300 is adjacent to the battery 720, and outputs a control signal S3 in response to the temperature and load current changes of the battery 720. The fourth control part 400 is connected to the pin 731 for controlling the recharging current of the charge part 730.

When the portable computer 700 is powered by the external power transformer 710, the first control part 100 outputs the control signal S1 in response to the temperature and load current changes of the external power transformer 710, and the second control part 200 responds to the control signal S1 to control the operation state of the OPU 750, and meanwhile, the fourth control part 400 responds to the control signal S1 to adjust the recharging current of the charge part 730, and at this moment, the third part 300 does not function.

When the power supplied from the external power transformer 710 is interrupted, the first part 100 does not function, and the portable computer 700 is powered by the battery 720, and meanwhile, the charge part 730 stops charging and the control part 400 controlling the charge part 730 also stops functioning. The power consumption of the portable computer 700 is controlled by the control signal S3 outputted from the third control part 300 in response to the temperature and load current changes of the battery 720, wherein the second control part 200 responds to the third control signal S3 to control the operation state of the OPU 750.

Hereinafter, the working way of each control part is explained in more details with reference the accompanying diagrams.

Figure 2:
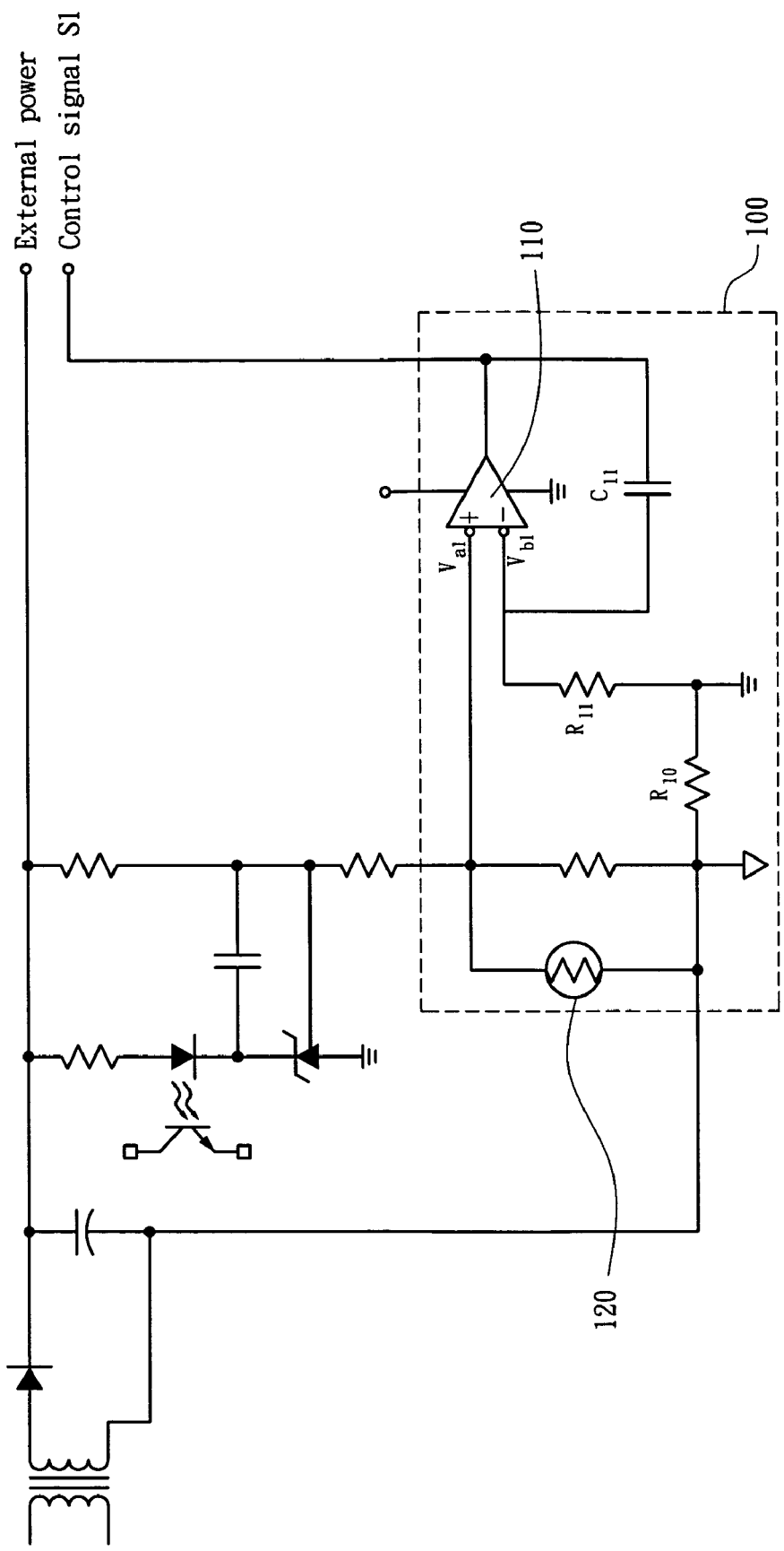
FIG. 2 a schematic circuit diagram of a first control part according to a preferred embodiment of the present invention.
Figure 6:
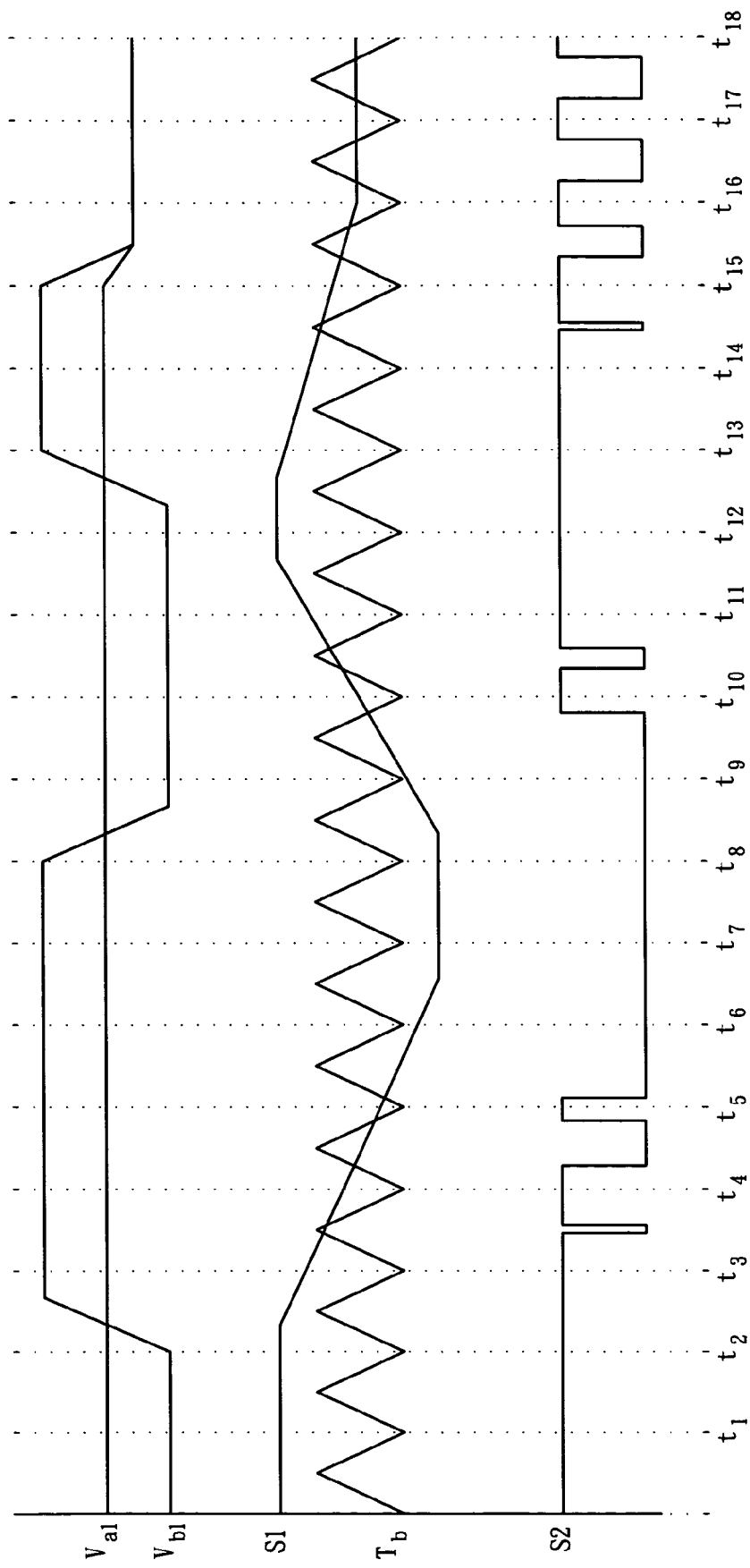
FIG. 6 is a control time-sequence diagram of the present invention.

Such as a preferred embodiment regarding the first control part 100 shown in FIG. 2, the first control part 100 is located in the external power transformer 710, and includes a comparing circuit 110 and a temperature sensor 120, wherein the temperature sensor 120 includes a thermosensitive resistor. A positive input terminal of the comparing circuit 110 is connected to the temperature sensor 120, and the voltage difference between two terminals of the temperature sensor 120 is used as a reference voltage Va1. Due to the function of the temperature sensor 120, the voltage value of the reference voltage Va1 will vary in accordance with the temperature change, wherein the voltage value decreases while temperature increases; and on the contrary, the voltage value increases while temperature decreases. A negative input terminal of the comparing circuit 110 is connected to a resistor R10, and the load current of the portable computer 700 flows through the resistor R10 so as to generate a comparing voltage Vb1. After comparing the comparing voltage Vb1 with the reference voltage Va1, the comparing circuit 110 outputs the control signal S1. When the comparing voltage Vb1 is higher than the reference voltage Va1, the control signal S1 outputted from the comparing circuit 110 changes from the high voltage level (Hi) to the low voltage level (Lo). On the contrary, when the comparing voltage Vb1 is lower than the reference voltage Va1, the control signal S1 outputted from the comparing circuit 110 changes from the low voltage level (Lo) to the high voltage level (Hi). Referring to the time-sequence diagram shown in FIG. 6, the reference voltage Va1 changes in accordance with temperature, and the comparing voltage Vb1 changes in accordance with the load current which changes according to the operation state of the portable computer 700. Referring to the status between t2 and t3, when Va1 begins to be smaller than Vb1, the control signal S1 outputted from the comparing circuit 110 begins to change from Hi to Lo; referring to the status between t8 and t9, when Va1 begins to be larger than Vb1, the control signal S1 outputted from the comparing circuit 110 begins to change from Lo to Hi. The slopes of changes between Hi and Lo depend on the values of a resistor R11 and a capacitor C11 shown in FIG. 2. When Va1 is equal to Vb1, the control signal S1 reaches a fixed value between Hi and Lo, such as the status shown at the time point t17.

Figure 3:
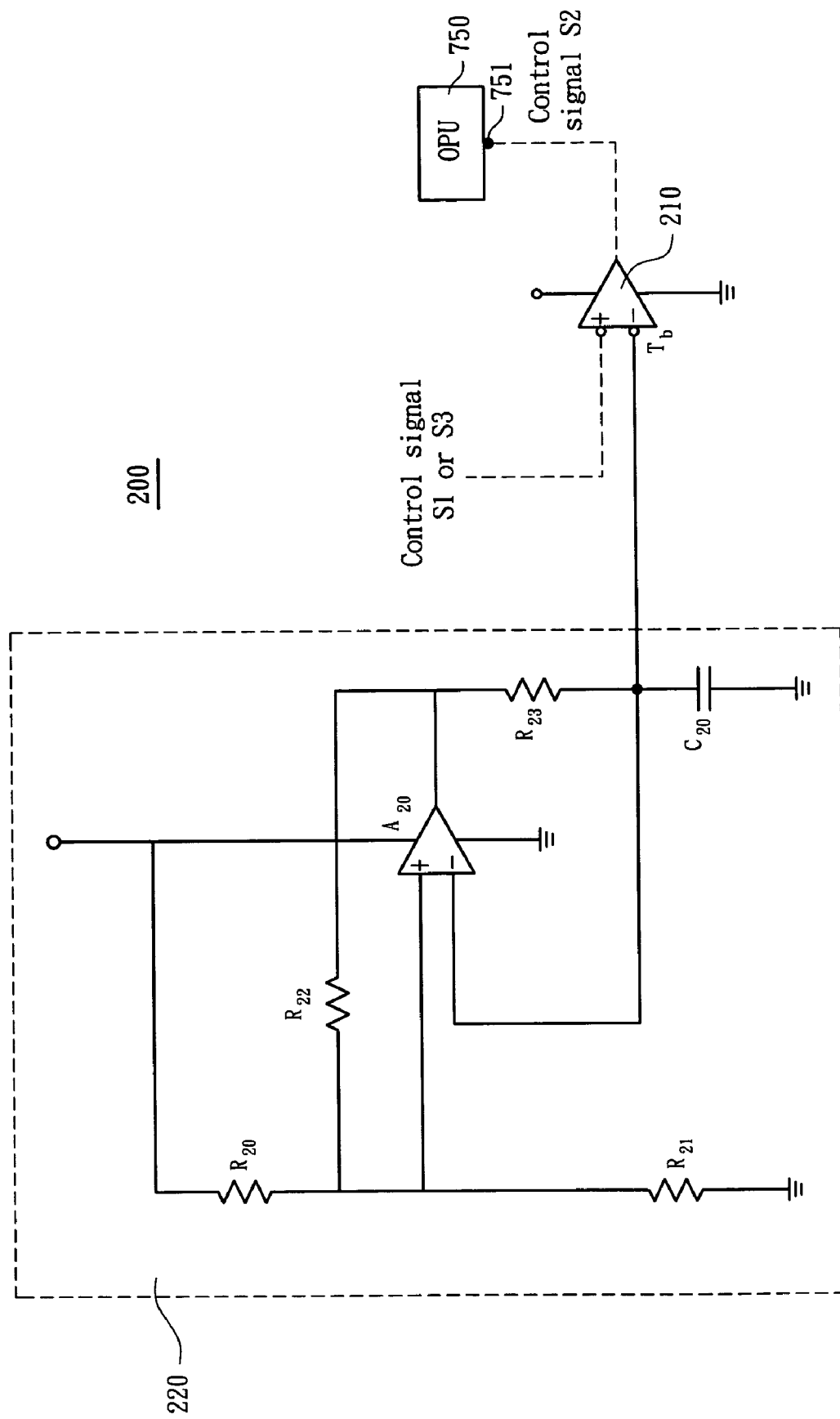
FIG. 3 a schematic circuit diagram of a second control part according to a preferred embodiment of the present invention.

Such as a preferred embodiment regarding the second control part 200 shown in FIG. 3, the second control part 200 includes a comparing circuit 210 and an oscillator circuit 220, wherein one input terminal of the comparing circuit 210 receives the control signal S1 or S3, and the other input terminal of the comparing circuit 210 is connected to the oscillator circuit 220. The oscillator circuit 220 generates a triangular wave-shaped time-sequence signal Tb. After comparing the control signal S1 with the triangular wave-shaped time-sequence signal Tb, the comparing circuit 210 outputs the control signal S2 corresponding to the pulse width to the pin 751 of the OPU 750. Such as the time-sequence diagram shown in FIG. 6, when the control signal S2 is Hi, the OPU 750 performs operation with high speed; and, when the control signal S2 is Lo, the OPU 750 performs operation with low speed, so that the power consumption of the portable computer 700 can be controlled by adjusting the operation state of the OPU 750 in accordance with pulse width. When the external power transformer 710 reaches the maximum power output, the high voltage level ratio of the control signal S2 is lowered, and the power consumption is also lowered accordingly.

Such as shown in FIG. 3, the aforementioned oscillator circuit 220 is composed of resistors R20, R21, R22, R23, a capacitor C20 and an operation amplifier A20, and yet, the components forming the oscillator circuit 200 are not limited thereto, and can be the components which can generate a time-sequence signal Tb enabling the comparing circuit 210 to output the control signal S2 corresponding to pulse width.

Figure 4:
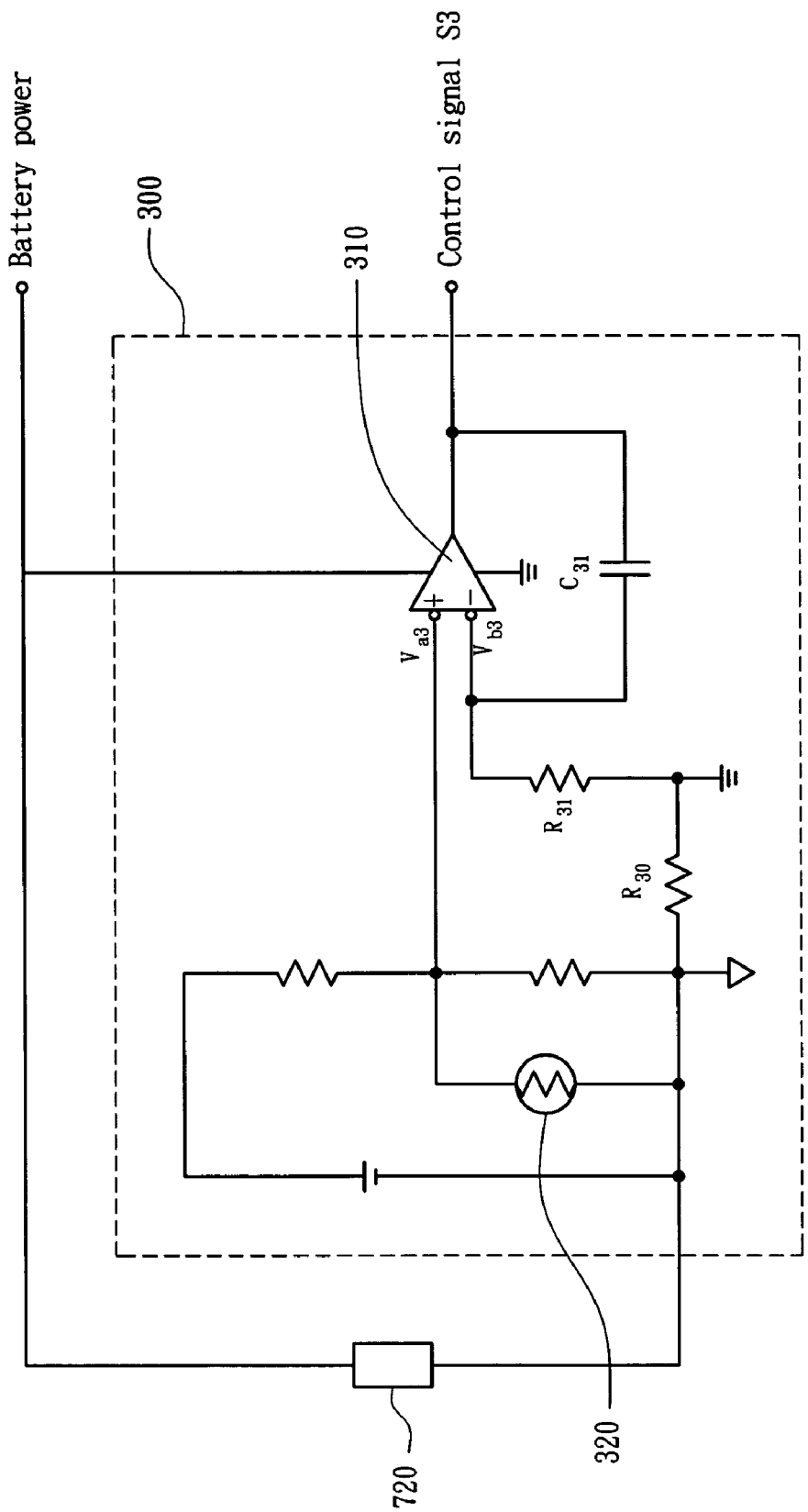
FIG. 4 is a schematic circuit diagram of a third control part according to a preferred embodiment of the present invention.
Figure 7:
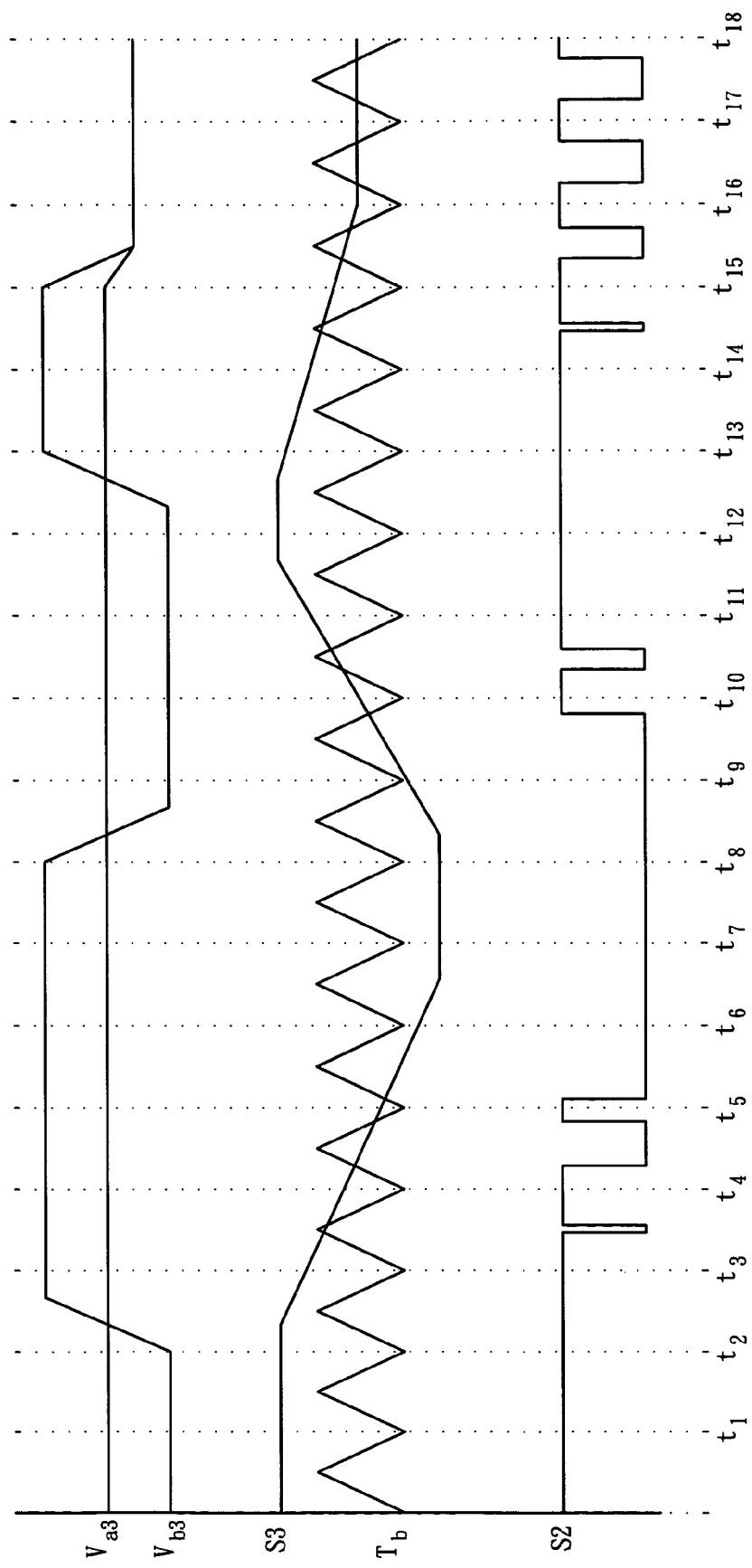
FIG. 7 is another control time-sequence diagram of the present invention.

Such as a preferred embodiment regarding the third control part 300 shown in FIG. 4, the third control part 300 is connected to the battery 720, and includes a comparing circuit 310 and a temperature sensor 320, wherein the temperature sensor 320 includes a thermosensitive resistor. A positive input terminal of the comparing circuit 310 is connected to the temperature sensor 320, and the voltage difference between two terminals of the temperature sensor 320 is used as a reference voltage Va3. Due to the function of the temperature sensor 320, the voltage value of the reference voltage Va3 will vary in accordance with the temperature change, wherein the voltage value of the reference voltage Va3 decreases while temperature of the temperature sensor 320 increases; and on the contrary, the voltage value of the reference voltage Va3 increases while temperature of the temperature sensor 320 decreases. A negative input terminal of the comparing circuit 310 is connected to a resistor R30, and the load current of the portable computer 700 flows through the resistor R30 so as to generate a comparing voltage Vb3. Such as shown in FIG. 7, after comparing the comparing voltage Vb3 with the reference voltage Va3, the comparing circuit 310 outputs the control signal S3. Referring to the status between t2 and t3, when the comparing voltage Vb3 begins to be larger than the reference voltage Va3, the control signal S3 outputted from the comparing circuit 310 begins to change from Hi to Lo; and on the contrary, referring to the status between t8 and t9, when the comparing voltage Vb3 begins to be smaller than the reference voltage Va3, the control signal S3 outputted from the comparing circuit 310 begins to change from Lo to Hi.

The third control part 300 is used to detect the temperature status of the battery 720. When the portable computer is powered by the external power transformer 710, the third control part 300 does not function. The control signal S1 sent from the first control part 100 in response to the temperature and load current changes is used to control the second control part 200 and the fourth control part 400. When the power from the external power transformer 710 is interrupted and the portable computer 700 is powered by the battery 720, the charge part 730 stops being recharged, and the fourth control part 400 controlling the charge part 730 also stops functioning. The power consumption of the portable computer 700 is controlled by using the control signal S3 sent from the third control part 300 in response to the temperature and load current changes to control the second control part 200 and further to control the operation state of the OPU 750.

Referring to the time-sequence diagram shown in FIG. 7, when the portable computer 700 is powered by the battery 720, the control signal S3 from the third control part 300 is used to control the power consumption of the portable computer 700, wherein the control method thereof is the same as that using the control signal S1 from the first control part 100, and the slopes of changes between Hi and Lo for the control signal S3 depend on the values of a resistor R31 and a capacitor C31 shown in FIG. 4. When Va1 is equal to Vb1, the control signal S1 reaches a fixed value between Hi and Lo, such as the status shown at the time point t17.

Figure 5:
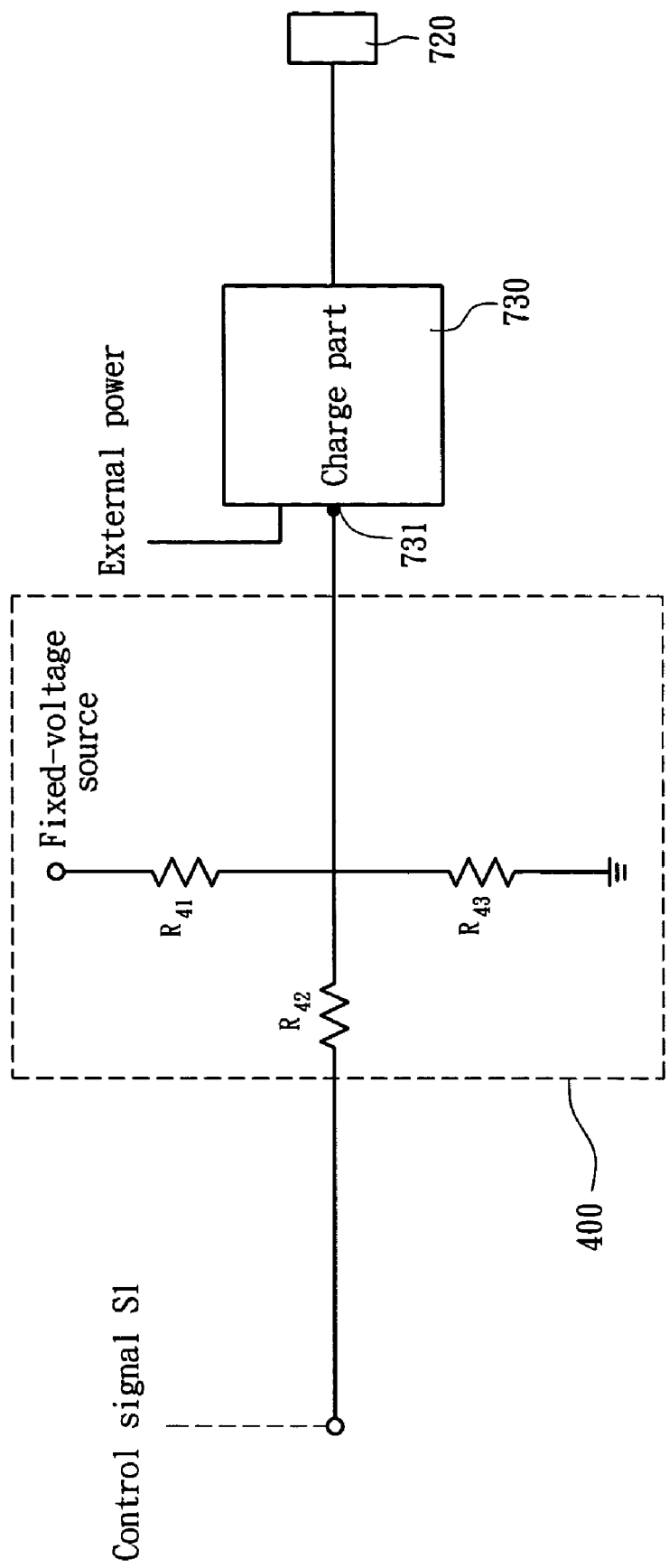
FIG. 5 is a schematic circuit diagram of a fourth control part according to a preferred embodiment of the present invention.

Such as a preferred embodiment regarding the fourth control part 400 shown in FIG. 5, the fourth control part 400 receives the control signal S1 to control the charge current of the charge part 730. When the voltage of the control signal S1 outputted from the first control part 100 descends, the fourth control part 400 controls the pin 731 of the charge part 730 to decrease the charge current. The fourth control part 400 includes three resistors R41, R42 and R43. One end of the combination of the three resistors is commonly connected to the pin 731, and the other ends of the three resistors are connected respectively to a fixed-voltage source, the control signal and ground, whereby the descending ratio of charge current and the minimum charge current are adjusted by adjusting the values of the three resistors R41, R42 and R43.

Various application examples can be practiced with the technical scope of the present invention. For example, the actual values of the aforementioned elements are not restricted and can be assigned to appropriate values in accordance with the actual application situations. Thus, those application examples also should be included in the claimed scope of the present invention.

It can be known from the preferred embodiments of the present invention that the present invention has the following advantages:

1. The output power can be dynamically adjusted for the external power transformer and the battery in response to the temperature change;

2. Regardless of output power and ambient temperature, the maximum temperatures of the external power transformer and the battery are not higher than the predetermined values, thus ensuring the performance and prolonging the operation life thereof;

3. The portable computer can be matched with various power external transformers and batteries of different output powers, since the power consumption thereof is automatically adjusted with temperature;

4. The external power transformer merely needs to be designed for satisfying the normal power consumption of the portable computer, and does not need to satisfy the maximum power consumption of the portable computer, thus saving production cost;

5. The external power transformer of relatively small size and light weight can be designed.

As is understood by a person skilled in the art, the foregoing preferred embodiments of the present invention are illustrated of the present invention rather than limiting of the present invention. It is intended to cover various modifications and similar arrangements included within the spirit and scope of the appended claims, the scope of which should be accorded the broadest interpretation so as to encompass all such modifications and similar structure.

What is claimed is:

1. A temperature control system, used in a portable computer, said temperature control system comprising:
    a first control part located in an external power transformer
        for generating a first control signal for controlling the operation state of an operation processing unit of said portable computer when said portable computer is powered by said external power transformer, said first control part comprising:
- a first temperature sensor used for detecting a first temperature of said external power transformer, thereby generating a first reference voltage which decreases when said first temperature increases; and
- a first comparing circuit, comprising:
  - a first input terminal used for receiving said first reference voltage; and
  - a second input terminal used for receiving a first comparing voltage generated from the load current of said external power transformer, thereby outputting said first control signal, wherein said first control signal changes from a high voltage level to a low voltage level when said first comparing voltage becomes higher than said first reference voltage, and said first control signal changes from said low voltage level to said high voltage level when said first comparing voltage becomes lower than said first reference voltage; and a second control part connected to said operation processing unit of said portable computer and used for generating a second control signal based on said first control signal for controlling the operation state of said operation processing unit when said portable computer is powered by said external power transformer.

2. The temperature control system of claim 1, further comprising:
a third control part adjacent to a battery of said portable computer for outputting a third control signal to said second control part for controlling the operation state of said operation processing unit when said portable computer is powered by said battery, said third control part comprising:
- a second temperature sensor used for detecting a second temperature of said battery, thereby generating a second reference voltage which decreases when said second temperature increases; and
- a second comparing circuit, comprising:
  - a third input terminal used for receiving said second reference voltage; and
  - a fourth input terminal used for receiving a second comparing voltage generated from the load current of said battery thereby outputting said third control signal, wherein said third control signal changes from said high voltage level to said low voltage level when said second comparing voltage is higher than said second reference voltage, and said third control signal changes from said low voltage level to said high voltage level when said second comparing voltage is lower than said second reference voltage.

3. The temperature control system of claim 2, further comprising:
a fourth control part connected to a charge part of said portable computer, and receiving said first control signal for controlling the charge current of said charge part when said portable computer is powered by said external power transformer, wherein the charge current of said charge part decreases when said first control signal descends.

4. The temperature control system of claim 3, wherein said fourth control part comprises:
three resistors commonly connected to said charge part, wherein a first end of the combination of said three resistors is connected to a fixed-voltage source; a second end of the combination of said three resistors receives said first control signal; and a third end of the combination of said three resistors is grounded, whereby the descending ratio of charge current and the minimum charge current are adjusted by adjusting the values of said three resistors.

5. The temperature control system of claim 1, wherein said second control part comprises:
an oscillating circuit used for generating a time-sequence signal; and a third comparing circuit, comprising:
- a fifth input terminal used for receiving, said time-sequence signal circuit; and
- a sixth input terminal used for receiving said first control signal, wherein said comparing circuit generates and outputs said second control signal used for controlling said operation processing unit, after comparing said time-sequence signal and said first control signal.

6. A temperature control system, used in a portable computer, said temperature control system comprising:
a first control part located in an external power transformer for generating a first control signal for controlling the operation state of an operation processing unit when said portable computer is powered by said external power transformer, said first control part comprising:
- a first temperature sensor used for detecting a first temperature of said external power transformer, thereby generating a first reference voltage which decreases when said first temperature increases; and
- a first comparing circuit, comprising:
  - a first input terminal used for receiving said first reference voltage; and
  - a second input terminal used for receiving a first comparing voltage generated from the load current of said external power transformer, thereby outputting said first control signal, wherein said first control signal changes from a high voltage level to a low voltage level when said first comparing voltage becomes higher than said first reference voltage, and said first control signal changes from said low voltage level to said high voltage level when said first comparing voltage becomes lower than said first reference voltage a third control part adjacent to a battery of said portable computer for generating a third control signal, for controlling the operation state of said operation processing unit when said portable computer is powered by said battery, said third control part comprising:
- a second temperature sensor used for detecting a second temperature of said battery, thereby generating a second reference voltage which decreases when said second temperature increases; and
- a second comparing circuit, comprising:
  - a third input terminal used for receiving said second reference voltage; and
  - a fourth input terminal used for receiving a second comparing voltage aenerated from the load current of said battery thereby outputting said third control signal, wherein said third control signal changes from said high voltage level to said low voltage level when said second comparing voltage is higher than said second reference voltage, and said third control signal changes from said low voltage level to said high voltage level when said second comparing voltage is lower than said second reference voltage; and a second control Part connected to said operation processing unit of said portable computer and used for generating a second control signal for controlling the operation state of said operation processin2 unit, wherein said second control signal is based on said first control signal when said portable computer is powered by said external power transformer, and is based on said third control signal when said portable computer is powered by said battery.

7. The temperature control system of claim 6, further comprising:
a fourth control part connected to a charge part of said portable computer and receiving said first control signal for controlling the charge current of said charge part when said portable computer is powered by said external power transformer, wherein the charge current of said charge part decreases when said first control signal descends.

8. The temperature control system of claim 7, wherein said fourth control part comprises:
three resistors commonly connected to said charge part, wherein a first end of the combination of said three resistors is connected to a fixed-voltage source; a second end of the combination of said three resistors receives said first control signal; and a third end of the combination of said three resistors is grounded, whereby the descending ratio of charge current and the minimum charge current are adjusted by adjusting the values of said three resistors.

9. The temperature control system of claim 6, wherein said second control part comprises:
an oscillating circuit used for generating a time-sequence signal; and
a third comparing circuit, comprising:
a fifth input terminal used for receiving said time-sequence signal, and
a sixth input terminal used for receiving said first control signal or said third control signal wherein said third comparing circuit generates and outputs said second control signal used for controlling said operation processing unit, after comparing said time-sequence signal and said first control signal or said third control signal.

* * * * *